Jan. 9, 1968
M. WEINSTOCK
3,362,215
APPARATUS FOR TESTING SEALS FOR PROPELLANT ACTUATED DEVICES
Filed Feb. 4, 1966
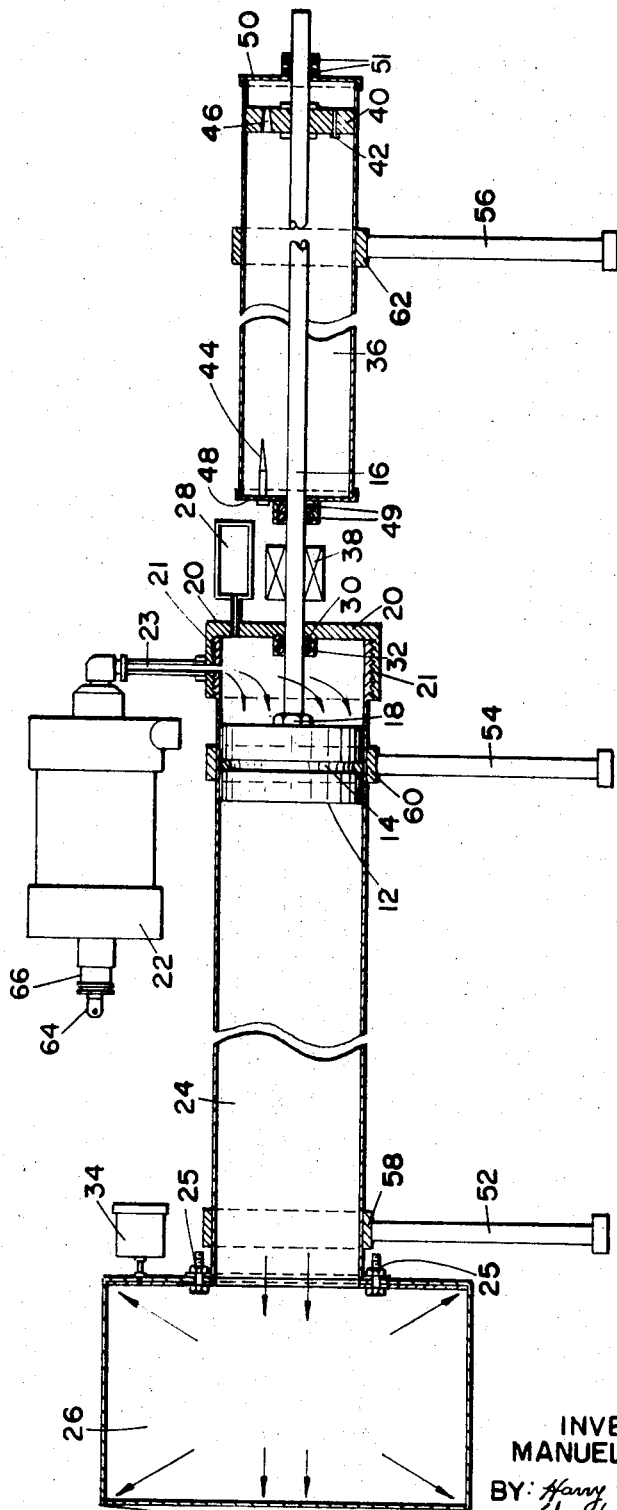
INVENTOR,
MANUEL WEINSTOCK
BY: Harry M. Saragovitz,
Edward J. Kelly,
Herbert Berl & S. Dubroff
ATTORNEYS.

United States Patent Office 3,362,215
Patented Jan. 9, 1968

3,362,215
APPARATUS FOR TESTING SEALS FOR PROPELLANT ACTUATED DEVICES
Manuel Weinstock, Philadelphia, Pa., assignor to the United States of America as represented by the Secretary of the Army
Filed Feb. 4, 1966, Ser. No. 525,810
10 Claims. (Cl. 73—47)

ABSTRACT OF THE DISCLOSURE

A device for measuring the static and dynamic sealing performance of selected seal configurations and sealing materials including a cylinder containing a leakage reservoir at one end and an end cap at the other, a piston located inside the cylinder carrying thereon a test specimen. A piston rod is attached to the piston and passes through the end cap into a hydraulic piston located in a hyraulic damper.

---

The invention described herein may be manufactured and used by or for the Government for governmental purposes without the payment to me of any royalty thereon.

This invention relates to an apparatus for testing seals for propellant actuated devices and more particularly for an apparatus for testing seals for propellant actuated devices by measuring leakage and leakage rates.

This invention describes an apparatus capable of determining, experimentally, the static and dynamic performance of sealing materials and seal configurations, either currently used or contemplated for application to propellant actuated devices.

The mechanism, quantity and time history of propellant gas leakage past the seals of such typical sliding tube propellant actuated devices as catapults and thrusters, though known to affect their ballistics and performance, have not previously been determined. Much of this data is not available because it must be determined experimentally. Most of the sealing materials and seal configurations used in propellant actuated devices are applications of commercially available products, and considerable manufacturers' data is available describing the sealing performance of these items. However, the transient nature of the propellant actuated devices' operating cycle and the severe environment imposed on these seals by the propellant gas, make this manufacturers' data of questionable value for use in connection with analysis and design of propellant actuated devices. Studies indicate that a more accurate computer simulation may be devised, and improved estimates of the interior ballistics and performance obtained if a leakage term is included in the energy balance equation. Close-up, high speed motion pictures also reveal that considerable leakage takes place past certain sliding seals in propellant actuated devices.

To yields meaningful data, the apparatus described herein may reproduce the intended operating enviroment and other performance parameters, realistically, in a controlled manner, and in a configuration which makes the desired data susceptible to measurement. To reproduce the propellant actuated devices' operating environment the following features have been incorporated in this apparatus: (1) The use of a propellant actuated device gas generator or other pressurized pneumatic medium as the power source to drive the piston on which the particular test specimen is mounted. This will expose the test items to the high pressure, high temperature, and erosive nature of the operating gases. (2) The provision of a hydraulic damper to control the piston velocity and thereby simulate the operating velocities and times, characteristic of these devices. The hydraulic damper also contains provisions for bringing the test specimens to rest without damage at the end of the test stroke. (3) The provision of a replaceable piston and test section housing to allow for testing a configuration which is as nearly identical as possible to the specimen for which leakage data is required. This will provide for, in a readily replaceable manner, selection of desired materials, tolerances, and finishes of the particular seals configuration, being tested. (4) The provision of the leakage reservoir of sufficient size and capacity to insure that the test specimen piston travel will not load the test device appreciably by compression of the gases on the low pressure side of the piston. (5) The provision of instrumentation which will monitor and record the time history of the test specimen, piston velocity and pressures developed in a particular test. (6) The apparatus is capable of initially conditioning the test section to a desired temperature.

An object of the present invention is the provision of an apparatus capable of obtaining data from experimental testing of sealing materials and seal configurations.

Another object is to provide an apparatus capable of measuring the total quantity of propellant gas leakage past a seal configuration.

A further object of the invention is the provision of an apparatus capable of providing the time history of propellant gas leakage.

Still another object is to provide an apparatus capable of obtaining data from experimental testing of sealing materials and seal configurations to enable a determination of the analytical form which should be used to represent propellant gas leakage in theoretical analysis.

A still further object of the invention is the provision of an apparatus capable of obtaining data from experimental testing of sealing materials and seal configurations to provide a comparison of the essentially steady state performance of a particular seal or sealing configuration with its performance during a transient type of operation.

The above objects as well as others together with the benefits and advantages of the invention will be apparent upon reference to the detailed description set forth below, particularly when taken in conjunction with the drawing annexed hereto in which is shown a side view of the invention.

As seen in the drwing, the apparatus consists of a test section consisting of a cylinder 24, a moveable piston 12 which carries a seal test specimen 14, whose sealing performance is to be determined, connected by a piston rod 16 and nut 18 and slidable in the end cap 20 through which the driving propellant gases are admitted from the gas generator 22 by way of the tube 23 in the direction of the arrows. The end cap 20 is threaded as at 21 to the cylinder 24 which is bolted at 25 to the leakage reservoir 26 at its other end. The end cap 20 is fitted with a piezo-electric pressure transducer 28 to measure and record the variations of pressure with travel, and seals or O-rings 30 and 32 to prevent undue loss of actuating gases from the test section. The effectiveness of seals 30 and 32 affect the operation of the device only in that they determine the level and shape of the pressure curve which represents the driving force applied to the test specimen. The leakage reservoir 26 contains a piezo-electric gauge leakage pressure transducer 34 which will monitor the time history pressure of the leakage gases. The piston rod 16 which connects the test section with the hydraulic damper 36 mounts a velocity coil transducer 38 in the space between the two units which determine the leakage-time rate. The hydraulic damper 36 is of conventional design and incorporates a piston 40 with variable orifices which may be interchanged to achieve approximately constant test section velocities as may be desired. The damper piston 40 also includes a check valve 42 which permits flow of damper fluid therethrough, thereby allowing the return of the damper piston 40 to its starting position after each test. As the piston 12 in the test chamber nears the end of the stroke, the needle valve 44 in the hydraulic damper 36 will engage a main orifice 46 in the damper piston 40 reducing the velocity of the moving mass and finally bringing it to rest. The piston rod 16 is held in said hydraulic damper 36 by a pair of end caps 48 and 50. Two pairs of O-rings or seals 49 and 51 are provided to prevent leakage. The entire apparatus is supported by pedestals 52, 54, and 56 which are attached to metallic bands 58, 60, and 62.

The operation of this apparatus is divided into three phases, i.e., pre-test, test, and post test. During the pre-test phase the following procedure is followed: (1) Assemble the piston 12, containing test specimen 14 therein in the cylinder 24. (2) Check the hydraulic damper 36 to insure that same is completely filled. (3) Install gas generator 22. (4) Check out all instrumentation and calibrate all transducers.

During the test phase the apparatus will be actuated mechanically from a remote station by withdrawing the lanyard pin 64 from the firing head 66. This will fire the gas generator 22 which, as it pressurizes, will break the blowout disc (not shown) and supply propellant gas (as shown by the arrows) to actuate the apparatus. The piston carrying the test seal will be displaced through its stroke under the action of the propellant gases supplied by the gas generator 22, with the piston velocity restrained by the action of the hydraulic damper 36. During test, any gases which leak past the seal will be collected in the leakage reservoir 26, and their pressure monitored by the pressure transducer 34. The driving gas pressure will be monitored during test by the pressure transducer 28, in the head of the device. As the piston nears the end of stroke, the needle valve 44 in the hydraulic damper 36 will engage the main orifice 46 in the damper piston 40 reducing the velocity of the moving mass thereby preventing damaging impact at the end of the stroke. The test specimen velocity will be monitored during this time by the velocity transducer 38 mounted between the test assembly and the hydraulic damper 36.

The post-test procedure will be as follows: (1) Insure that functioning of the gas generator 22 has been completed. (2) Vent the leakage reservoir 26.

This apparatus is intended to operate over the range of parameters to which the sealing materials and seal configurations are subject in propellant actuated devices.

Obviously many modifications and variations of the present invention are possible in light of the above teachings. It is therefore to be understood that within the scope of the appended claims, the invention may be practiced otherwise than as specifically described.

I claim:
1. A testing apparatus for measuring the static and dynamic sealing performance of selected seal configurations and sealing materials including a hydraulic damper, a power source and a test section cylinder, said test section cylinder containing a leakage reservoir on one end and an end cap on the other, a moveable piston located inside said cylinder carrying therein a test specimen, a piston rod attached to said moveable piston, said piston rod passing through said end cap into a hydraulic piston located in said hydraulic damper.

2. An apparatus of the type described in claim 1, wherein said hydraulic damper includes end caps to guide the piston rod therethrough.

3. An apparatus of the type described in claim 2, wherein said power source comprises a propellant actuated gas generator.

4. An apparatus of the type described in claim 3, wherein said hydraulic damper includes valving means for reducing the velocity of the piston at the end of the test stroke.

5. An apparatus of the type described in claim 4, wherein said piston rod has means located between said cylindrical test section and said hydraulic damper to monitor and record specimen carrying piston velocity.

6. An apparatus of the type described in claim 5, wherein said means includes a velocity coil transducer.

7. An apparatus of the type described in claim 4, wherein said leakage reservoir has means located thereon to monitor and record the pressure therein.

8. An apparatus of the type described in claim 7, wherein said last-mentioned means include a piezo-electric transducer to monitor the pressure of gases which collect in the leakage reservoir.

9. An apparatus of the type described in claim 4, wherein said cylinder end cap has means to measure and record the variation of pressure with travel of the test specimen.

10. An apparatus of the type described in claim 9, wherein said last-mentioned means include a piezo-electric driving pressure transducer.

References Cited

UNITED STATES PATENTS

| | | | |
|---|---|---|---|
| 2,804,683 | 6/1937 | Hewitt | 73—47 |
| 2,468,050 | 4/1949 | Dwyer et al. | 73—47 |
| 2,696,730 | 12/1954 | Justice | 73—40 XR |

FOREIGN PATENTS

| | | |
|---|---|---|
| 671,423 | 2/1952 | Great Britain. |

LOUIS R. PRINCE, *Primary Examiner.*

J. NOLTON, *Assistant Examiner.*